United States Patent
Rajagopalan

(10) Patent No.: US 7,621,075 B2
(45) Date of Patent: Nov. 24, 2009

(54) PLANTER LINER HAVING AN INTEGRAL WATER TRAY

(75) Inventor: Ravi Rajagopalan, Wayne, PA (US)

(73) Assignee: The Pride Group, Inc., King of Prussia, PA (US)

( * ) Notice: Subject to any disclaimer, the term of this patent is extended or adjusted under 35 U.S.C. 154(b) by 74 days.

(21) Appl. No.: 10/903,979

(22) Filed: Jul. 30, 2004

(65) Prior Publication Data
US 2005/0011120 A1      Jan. 20, 2005

Related U.S. Application Data

(63) Continuation-in-part of application No. 10/403,170, filed on Mar. 31, 2003, now Pat. No. 6,789,355.

(60) Provisional application No. 60/399,477, filed on Jul. 29, 2002.

(51) Int. Cl.
*A01G 9/02* (2006.01)
(52) U.S. Cl. .................................................. 47/65.7
(58) Field of Classification Search .................. 47/65.7
See application file for complete search history.

(56) References Cited

U.S. PATENT DOCUMENTS

| | | | |
|---|---|---|---|
| 1,532,325 A * | 4/1925 | Lee .............................. 156/91 |
| 2,274,095 A | 2/1942 | Sawyer |
| 3,017,304 A | 1/1962 | Burgeni |
| 3,818,633 A | 6/1974 | Sable |
| 3,866,352 A | 2/1975 | Herveling et al. |
| 3,958,365 A * | 5/1976 | Proctor ........................ 47/65.5 |
| 5,018,300 A | 5/1991 | Chiu et al. |
| 5,171,390 A | 12/1992 | Travers |
| 5,335,449 A | 8/1994 | Beatty |
| 5,454,191 A | 10/1995 | Mayeda et al. |
| 5,829,193 A * | 11/1998 | Otake et al. ................... 47/65.8 |
| 6,318,022 B1 | 11/2001 | Just |
| 6,465,712 B1 | 10/2002 | Matthews et al. |
| 6,643,978 B2 | 11/2003 | Price |
| 6,722,081 B1 * | 4/2004 | Bradley et al. ............... 47/65.7 |

FOREIGN PATENT DOCUMENTS

| WO | WO 00/32392 | * | 6/2000 |
| WO | WO00/32392 | * | 6/2000 |
| WO | WO0032392 | * | 6/2000 |

* cited by examiner

*Primary Examiner*—Francis T Palo
(74) *Attorney, Agent, or Firm*—Barley Snyder LLC

(57) ABSTRACT

A liner for use in a horticultural planter contains an integral water tray which is located between inner and outer fibrous layers of a liner. The water tray extends from a bottom surface of the liner toward a peripheral top edge. An overflow region is included with the water tray near the peripheral top edge of the liner.

15 Claims, 2 Drawing Sheets

PLANTER LINER HAVING AN INTEGRAL WATER TRAY

RELATED APPLICATION DATA

This application is a continuation-in-part of application Ser. No. 10/403,170, filed Mar. 31, 2003, now U.S. Pat. No. 6,789,355; Issued on Sep. 14, 2004, which claims the benefit of U.S. Provisional Application No. 60/399,477, filed Jul. 29, 2002.

FIELD OF THE INVENTION

The present invention relates to a horticultural planter and more specifically to such a planter having a liner which includes an integral water tray.

BACKGROUND OF THE INVENTION

Planters in the form of hanging baskets have been utilized by home gardeners, horticultural professionals and enthusiasts for growing a variety of decorative and other plants. These planters typically include a steel or otherwise rigid basket which forms a generally open semi-circular structure. Inside the basket, a material which allows the passage of air such as sphagnum moss is utilized for lining the open basket structure. Applying the sphagnum moss usually entails taking dried moss, which is brittle and crumbly, and soaking it in water to make it sufficiently pliable to mold it around the interior of the basket. This process has been found to be time consuming and often times results in inconsistent functional properties of the resultant lining.

A soil or other growing material is then placed within the lining for supporting the roots of plantings. It is desirable in these horticultural applications to retain a desirable amount of water in the area of the plant roots while allowing for air to flow into that same area.

In response to the need for greater consistency and efficiency in making these baskets, several preformed liners have been developed for use with these baskets. For example, U.S. Pat. No. 5,454,191 teaches a preformed liner for use in a wire hanging basket. The liner is formed of a fibrous material and has a water controlling material embedded therein. This patent teaches that the liner is formed by joining two halves of the water controlling material at a seam which runs laterally across the center of the liner. The seam extends from one end of a top peripheral surface to another end of the top peripheral surface such that the liner is formed of two symmetrical halves.

U.S. Pat. No. 5,829,193 also teaches a liner for a horticultural hanging pot which has water retention features. This patent discloses a liner formed of several layers including a hemp cloth layer, a super absorbent polymer powder layer, a peat moss powder layer, a jute liner, and a porous plastic film layer. All layers, including the porous plastic layer which serves to retain water, extend over the entire surface of the liner. Therefore, when installed, the porous plastic layer extends all the way to the top peripheral surface of the basket thus having the capability to retain water up to this top peripheral edge.

A problem exists in that both these designs allow for overfilling of the liner which may prevent adequate air flow therethrough. Each of these liners attempt to mitigate the over watering problem by allowing for passage of water through essentially the bottom end of the basket.

SUMMARY OF THE INVENTION

A liner for use in a horticultural planter according to the present invention contains an integral water tray which is located between inner and outer fibrous layers of a liner. The water tray extends from a bottom surface of the liner toward a peripheral top edge. The water tray is integral with the liner and located between outer and inner fibrous layers. An overflow region is included with the water tray near the peripheral top edge of the liner.

BRIEF DESCRIPTION OF THE DRAWINGS

The invention will now be described by way of example with reference to the accompanying figures of which.

DETAILED DESCRIPTION OF THE PREFERRED EMBODIMENTS

Figure 1:
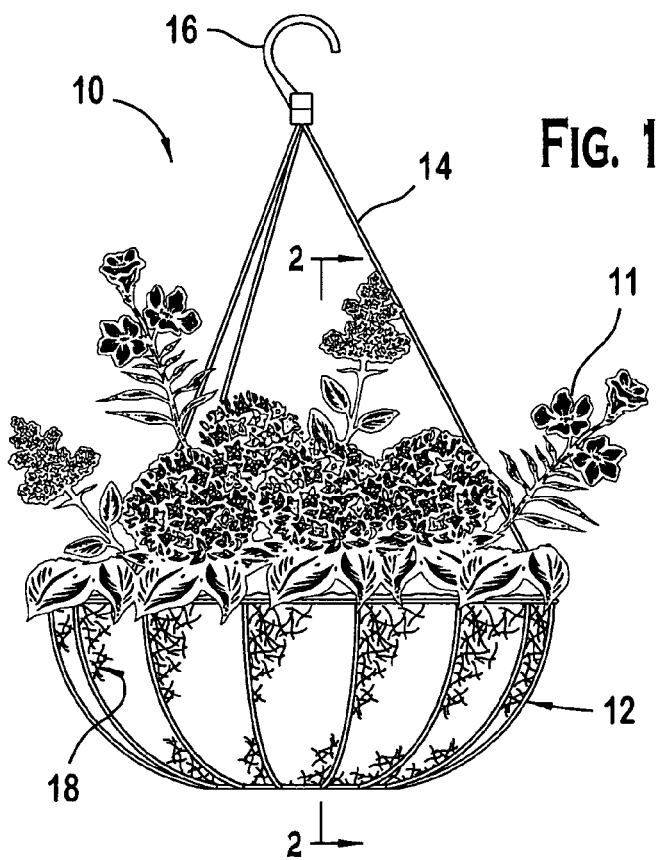
FIG. 1 is a perspective view of a planter having a liner according to the present invention.
Figure 2:
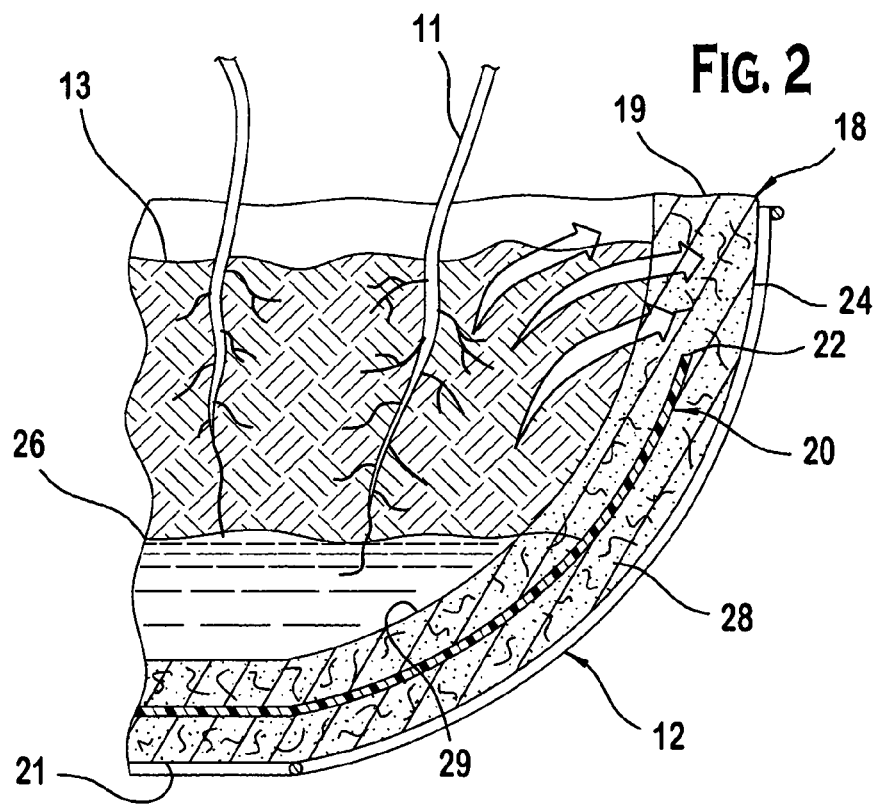
FIG. 2 is a cross sectional view taken along the line 2-2 of FIG. 1.

The invention will first be described generally with reference to FIG. 1 and then more specifically with reference to FIGS. 2 and 3. As best shown in FIG. 1, a planter 10 is formed of a basket 12 which supports a liner 18. The basket 12 is formed of a rigid wire like material or may alternatively be formed of any suitable rigid material such as various organics, plastics or composites. These include, but are not limited to, willow, rattan, bamboo, galvanized steel and copper. In this embodiment, the basket 12 is shown as being of an open construction formed in a semi-spherical shape. Although the shape of the basket in this embodiment is semi-spherical, it should be understood that many other forms which would hold water and soil would be apparent to one reasonably skilled in the art. For example, the basket 12 may be formed in the shape of a window box, or any other rectangular, conical, or frustoconical shape. A series of brackets or hangers 14 extend upward from the basket 12 and are attached to a hook 16. It should also be understood that the hangers 14 and hook 16 are provided for hanging the basket 12, but that the basket 12 is nonetheless mountable in other ways depending upon its shape. For example, in a window box application the basket may be fastened or otherwise hung over a windowsill, or supported by a wall with various mounting features.

A liner 18 is placed within the basket 12 for supporting soil 13 or other suitable growing media. Plants 11 are supported within the soil 13. Referring to FIG. 2, the liner 18 is formed of a fibrous or other porous material which allows passage of both air and water therethrough. Exemplary material for forming the liner 18 include coco fiber, sphagnum moss, paper/pulp mache, sisal or similar grass or Spanish moss. The liner 18 is formed to generally conform with and rest upon the inner surface of the basket 12. In this embodiment, the liner is bowl shaped to conform to the basket 12. The liner 18 contains an inner fibrous layer 29, an outer fibrous layer 28 and a peripheral top edge 19 which extends upward from a bottom surface 21. The bottom surface 21 forms a closed end while the peripheral top edge 19 defines an open end. In the case of this embodiment, the peripheral top edge 19 is positioned around a circular open end of a semi-spherical basket 12. As shown in FIG. 2, the peripheral top edge 19 extends slightly beyond the periphery of the basket 12. It should be understood, however, that the precise location of the peripheral top edge 19 relative to the basket 12 may be varied according to aesthetic and other horticultural requirements for a particular application.

An integral water tray 20 is supported within the liner 18. The water tray 20 may be formed of a flexible or semi-rigid water blocking material such as plastic. Alternatively, the water tray 20 may be formed of a semi-porous or perforated water resistant material for allowing a controlled amount of water passage. Although FIG. 2 shows the water tray 20 as being embedded in the liner 18 at a location which is approximately half way between its inner and outer fibrous layers 29, 28, it should be understood that this water tray 20 may be either nearer or farther from the inner surface of the liner 18. The thickness of each fibrous layer 28, 29 may be varied and the water tray 20 may optionally form a portion of one of the inner or outer surfaces. The water tray 20 extends over a substantial portion of the liner 18 up to a peripheral edge 22. The peripheral edge 22 is located below the peripheral top edge 19 of the liner 18. Because of this arrangement, an overflow region 24 is formed between the peripheral edge 22 and the peripheral top edge 19. As indicated by the arrows in FIG. 2, the overflow region 24 allows the passage of air and/or water therethrough. It should be understood that while the arrows are drawn to show the egress of either water or air, air may also enter through the overflow region 24 in a direction opposite the arrows.

Figure 3:
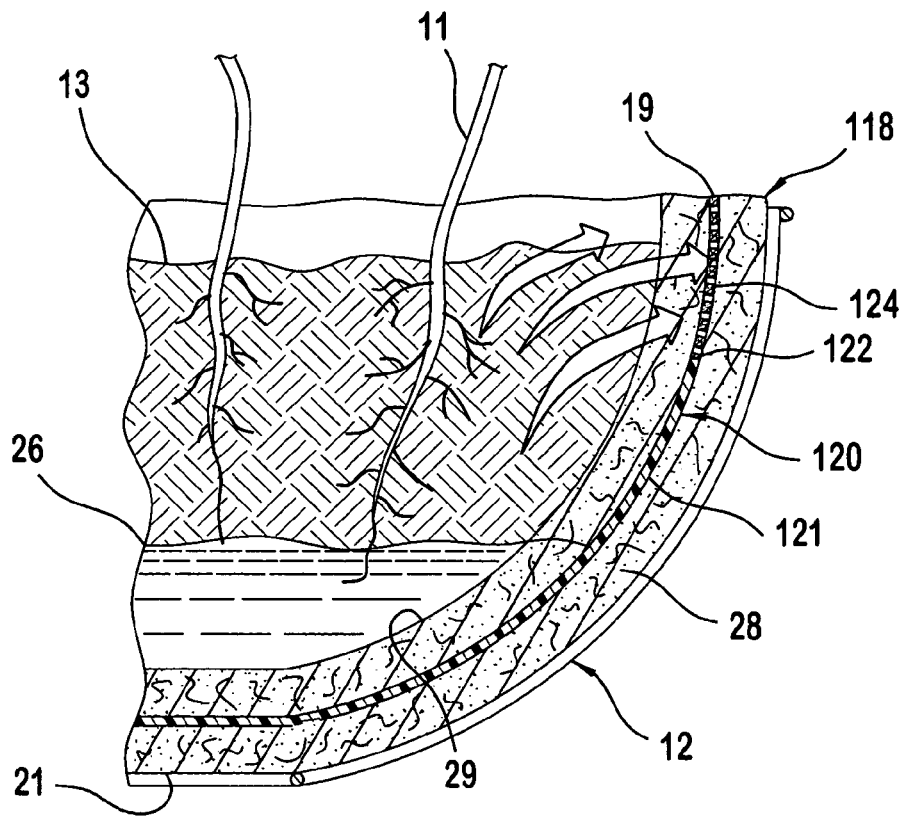
FIG. 3 is a cross sectional view, similar to that of FIG. 2 of an alternate planter.

An alternate embodiment of a liner 118 and an integral water tray 120 is shown in FIG. 3 and will now be described in greater detail. The liner 118 is similarly placed within the basket 12 for supporting soil 13 or other suitable growing media. The material of the liner and layers 28, 29 are similarly formed as described above with various options for material, shape, and placement of the components as described above. The water tray 120 is modified in this embodiment to have a different overflow region 124 extending from a base region 121. The water tray 120 is similarly supported within the liner 118 and may be formed of a flexible or semi-ridged water blocking material such as plastic. The water tray 120 may alternatively be formed of a semi-porous material. The water tray 120 extends over a substantial portion of the liner 118 up toward the peripheral top edge 19 thereof. The water tray 120 is modified in that a transition 122 is formed at a location below the peripheral top edge 19. Between the transition 122 and the peripheral top edge 19, an overflow region 124 is formed. The overflow region 124 may be integral with the base region 121 of the water tray 120 or otherwise joined thereto. The overflow region 124 may be formed for example by perforating the material of the water tray 120 above the transition 122. Perforations in the overflow region 124 allow for passage of water and air therethrough. Alternatively, the overflow region 124 could be formed of an alternate porous material which is joined to the base region 121 of the water tray 120 at the transition 122. In this case the material of the overflow region 124 is at least as porous as that of the base region 121 and is preferably more porous than that of the base region 121. It should be understood that although the overflow region is shown as extending to the peripheral top edge 19, it may be designed such that at least one of the inner and outer fibrous layers 29, 28 are wrapped around the top of the overflow region 124 such that it extends only to area just below the peripheral top edge 19 and/or above the soil 13. It should also be understood that the transition 122 and overflow region 124 may be located at other locations along the base region 121 to achieve different water levels 26 as will be described below. This is shown in the alternate embodiment of FIG. 4 wherein two transitions 122 are provided at opposite ends of the overflow region 124 located along the base region 121 below the peripheral top edge 19. Above this upper most transition 122, a non porous or porous extension section 125 may be provided as desired to either restrict or allow the passage or water above the second transition.

Manufacture and assembly of the liner 18 will now be described in greater detail. The liner 18 is formed by wetting a first layer of fibrous material such as coco fiber. A binding material such as latex may be included in the wetting step. The wet first layer is laid in a mold, which in the embodiment shown, would consist of a semi-spherical or bowl shaped member. The first layer of the fibrous material therefore forms the outer fibrous layer 28. The outer fibrous layer 28, shown in the embodiment of FIG. 1, is seamless because the wet first layer is laid into a mold as described above. The water blocking material for forming the water tray 20 is cut to a desired shape, which in the embodiment shown, is a circular shape and then laid over the first layer within the mold such that its peripheral edge 22 is located below the peripheral top edge 19. A second layer of fibrous material is wetted with a binding agent and placed over the water tray 20 within the mold. Since at least one and possibly both layers of the fibrous material are wet with the binding agent, they adhere to each other and to the water tray 20 to form an integral assembly. The second layer of fibrous material therefore forms the inner fibrous layer 29. Similarly, The inner fibrous layer 29, shown in the embodiment of FIG. 1, is seamless because the wet second layer is laid over the water tray in the mold as described above. During this process, the first layer may be rolled over the second layer at the peripheral top edge 19. The formed liner 18 is then removed from the mold and dried such that it maintains the molded shape after drying. The liner 18 is then placed within the basket 12 and filled with suitable soil 13 and plants 11.

Figure 4:
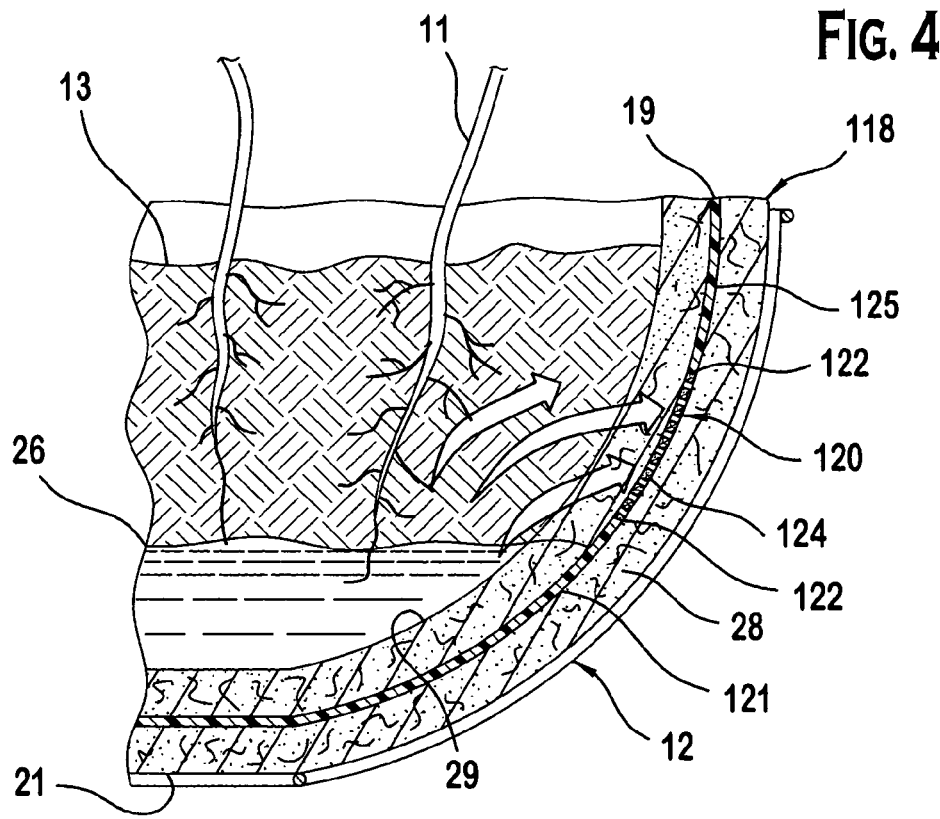
FIG. 4 is a cross sectional view, similar to that of FIG. 3 of another alternate planter.

A water level 26 is therefore advantageously maintained by the water tray 20 and in the event that the basket 12 is overfilled, the water level 26 will rise to the peripheral edge 22 and then overflow in order to maintain a relatively drier portion of soil above the water level 26 and within or below the peripheral top edge 19 of the liner 18. The peripheral edge 22 may be located at various levels in order to achieve the proper water level and air flow through the overflow region 24 for a given horticultural application As shown and described in the alternate embodiment of FIG. 3, the overflow region 124 may have various perforations or various porous materials to control the water level 26 achieving a desired limit to the water held in the liner 118. The overflow region 124 may also be alternatively located in various locations along the base region 121 of the water tray 120 as shown in FIG. 4 to change or control the desired water level 26.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A liner for a planter comprising:
a fibrous outer layer extending from a bottom surface of the liner to a peripheral top edge;
an inner fibrous layer located adjacent to the outer fibrous layer and also extending to a peripheral top edge; and a water tray located between the inner and outer fibrous layers, the water tray having a base region extending adjacent the bottom surface and upward toward the peripheral top edge to a transition and further having an integral over flow region including perforations located upward of the transition, the over flow region being more porous than the base region.

2. The liner of claim 1 wherein the water tray is formed of plastic.

3. The liner of claim 1 further comprising a second transition.

4. The liner of claim 3 further comprising an extension section between the second transition and the peripheral top edge.

5. The liner of claim 4 wherein the extension section is formed of a non-porous material.

6. The liner of claim 4 wherein the extension section is formed of porous material.

7. The liner of claim 1 wherein the outer and inner fibrous layers are seamless.

8. The liner of claim 1 wherein the water tray is formed of a non-porous material.

9. The liner of claim 1 wherein the water tray is formed of a semi-porous material.

10. The liner of claim 1 wherein the liner is bowl shaped such that the peripheral top edge defines a circular opening and the area between the peripheral top edge and the bottom surface is semi-spherical.

11. The liner of claim 1 wherein the outer and inner fibrous layers are formed of coco fiber.

12. The liner of claim 1 wherein the outer and inner fibrous layers are formed of sphagnum moss.

13. The liner of claim 1 wherein the outer and inner fibrous layers are formed of paper/pulp mache.

14. The liner of claim 1 wherein the outer and inner fibrous layers are formed of sisal.

15. The liner of claim 1 wherein the outer and inner fibrous layers are formed of Spanish moss.

* * * * *